(12) United States Patent
Bai et al.

(10) Patent No.: US 11,869,142 B2
(45) Date of Patent: *Jan. 9, 2024

(54) METHODS AND DEVICES FOR THREE-DIMENSIONAL IMAGE RECONSTRUCTION USING SINGLE-VIEW PROJECTION IMAGE

(71) Applicant: Shenzhen Keya Medical Technology Corporation, Shenzhen (CN)

(72) Inventors: Junjie Bai, Seattle, WA (US); Shubao Liu, College Park, MD (US); Youbing Yin, Kenmore, WA (US); Feng Gao, Seattle, WA (US); Yue Pan, Seattle, WA (US); Qi Song, Seattle, WA (US)

(73) Assignee: SHENZHEN KEYA MEDICAL TECHNOLOGY CORPORATION, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,373

(22) Filed: Dec. 21, 2021

(65) Prior Publication Data

US 2023/0097133 A1    Mar. 30, 2023

Related U.S. Application Data

(60) Provisional application No. 63/248,999, filed on Sep. 27, 2021.

(51) Int. Cl.
    *G06T 17/00*    (2006.01)
    *G06T 7/50*    (2017.01)

(52) U.S. Cl.
    CPC ............... *G06T 17/00* (2013.01); *G06T 7/50* (2017.01); *G06T 2207/10116* (2013.01); *G06T 2207/30101* (2013.01); *G06T 2210/41* (2013.01)

(58) Field of Classification Search
    None
    See application file for complete search history.

(56) References Cited

U.S. PATENT DOCUMENTS

| | | | | |
|---|---|---|---|---|
| 2020/0020079 A1* | 1/2020 | Gauriau | ............... | G06T 17/00 |
| 2021/0158580 A1* | 5/2021 | Barroyer | ............... | G06T 11/005 |
| 2022/0164950 A1* | 5/2022 | Aben | ............... | A61B 6/507 |

* cited by examiner

*Primary Examiner* — Frank S Chen
(74) *Attorney, Agent, or Firm* — Bayes PLLC

(57) ABSTRACT

The disclosure provides a method, device and a computer-readable medium for performing three-dimensional blood vessel reconstruction. The device includes an interface configured to receive a single-view two-dimensional image of a blood vessel of a patient, where the single-view two-dimensional image is a projection image acquired in a predetermined projection direction. The device further includes a processor configured to estimate three-dimensional information of the blood vessel from the single-view two-dimensional image using an inference model, and reconstruct a three-dimensional model of the blood vessel based on the three-dimensional information.

18 Claims, 7 Drawing Sheets

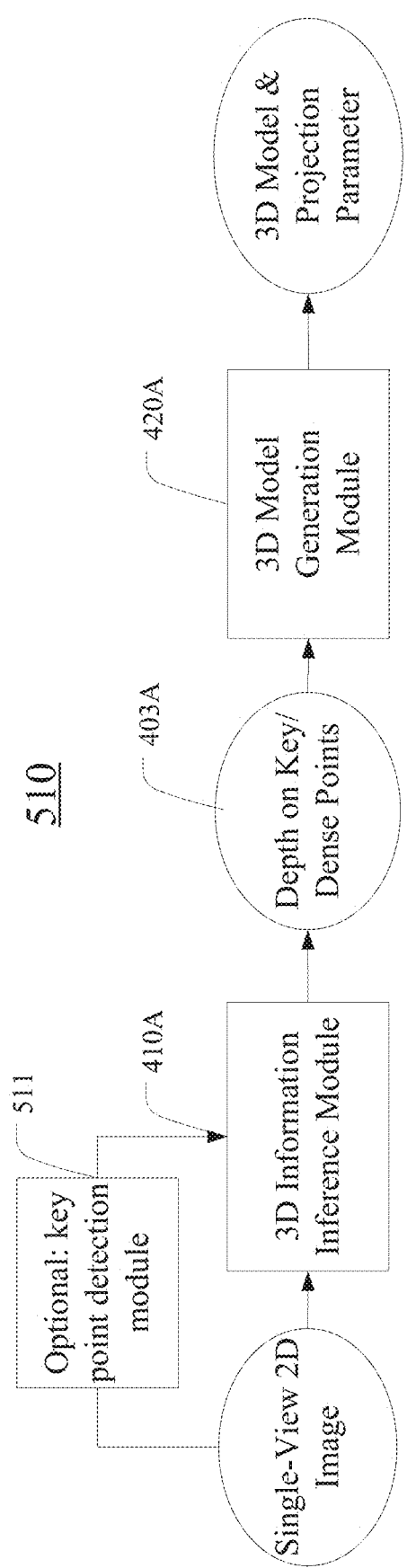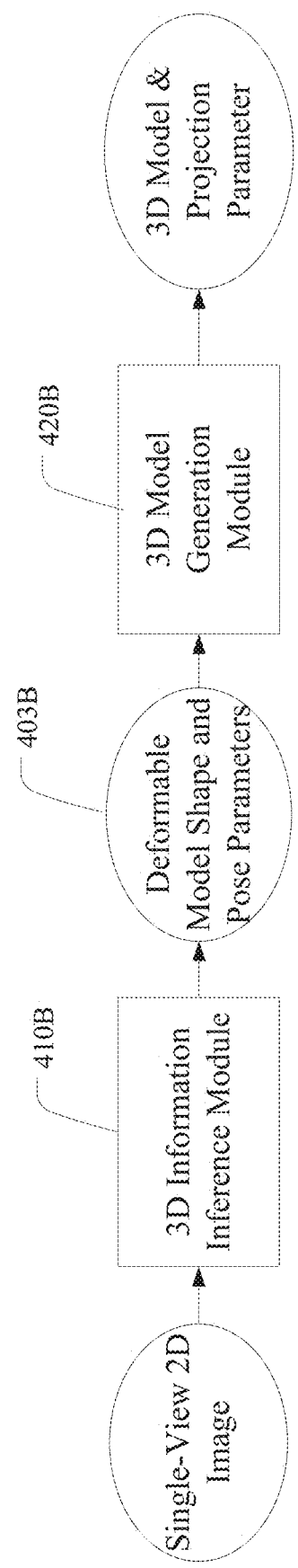

METHODS AND DEVICES FOR THREE-DIMENSIONAL IMAGE RECONSTRUCTION USING SINGLE-VIEW PROJECTION IMAGE

CROSS REFERENCE TO RELATED APPLICATIONS

The present application claims the benefits of priority to U.S. Provisional Application No. 63/248,999, filed Sep. 27, 2021, the content of which is incorporated herein by reference in its entirety. The present application also relates to U.S. application Ser. No. 17/497,980, filed Oct. 11, 2021, the content of which is also incorporated herein by reference in its entirety.

TECHNICAL FIELD

The present disclosure generally relates to three-dimensional image reconstruction. More specifically, the present disclosure relates to methods and systems for performing three-dimensional image reconstruction using a single-view projection image.

BACKGROUND

Two-dimensional (2D) X-ray angiographic images provide valuable geometric information on vascular structures for diagnoses of various vascular diseases, such as coronary artery diseases and cerebral diseases. After a contrast agent (usually an x-ray opaque material, such as iodine) is injected into the vessel, the image contrast of the vessel regions is generally enhanced. Three-dimensional (3D) vascular tree reconstruction using the 2D projection images is often beneficial to reveal the true 3D measurements, including diameters, curvatures and lengths, of various vessel segments of interests, for further functional assessments of the targeted vascular regions.

Although vessels are usually 3D tortuous tube-like object, an angiographic image only provides a projection view from a certain angle. Traditionally, multiple angiographic images projected from different angles are required in order to reconstruct the 3D model of the target vessel. One technical challenge presented by such methods is the foreshortening issue. The vessel lengths are slightly different when viewed from different angles due to the nature of the projection imaging, causing foreshortening. Generally, foreshortening may be reduced by avoiding using images containing pronounced foreshortening vessel segments (represented with darker intensity) for 3D reconstruction. However, at least some level of foreshortening frequently occurs due to the curved geometrical nature of vessels and due to physiological motion of the patient during the imaging process (e.g., due to respiratory motion and cardiac motion).

Moreover, the existing 3D reconstruction method not only require multi-view projection images, but also the projection angles need to meet certain criteria, such as minimum angle difference, in order for these multi-view reconstruction algorithms to work satisfactorily. This makes the task of reconstructing 3D vessel model challenging, and not always attainable.

Embodiments of the disclosure address the above problems by systems and methods for improved three-dimensional image reconstructions.

SUMMARY

Embodiments of the present disclosure include computer-implemented methods and devices for performing three-dimensional blood vessel reconstruction using a single-view projection image.

In one aspect, the disclosure is further directed to a device for performing three-dimensional blood vessel reconstruction. The device includes an interface configured to receive a single-view two-dimensional image of a blood vessel of a patient, where the single-view two-dimensional image is a projection image acquired in a predetermined projection direction. The device further includes a processor configured to estimate three-dimensional information of the blood vessel from the single-view two-dimensional image using an inference model, and reconstruct a three-dimensional model of the blood vessel based on the three-dimensional information.

In another aspect, the disclosure is directed to a computer-implemented method for performing three-dimensional image reconstruction. The computer-implemented method includes receiving a single-view two-dimensional image of a patient, where the single-view two-dimensional image is a projection image acquired in a predetermined projection direction. The method further includes estimating, by a processor, three-dimensional information from the single-view two-dimensional image using an inference model, and reconstructing, by the processor, a three-dimensional model based on the three-dimensional information.

In yet another embodiment, the disclosure is directed to a non-transitory computer-readable medium, having instructions stored thereon. The instructions, when executed by a processor, perform a method for performing three-dimensional image reconstruction. The method includes receiving a single-view two-dimensional image of a patient, where the single-view two-dimensional image is a projection image acquired in a predetermined projection direction. The method further includes estimating three-dimensional information from the single-view two-dimensional image using an inference model, and reconstructing a three-dimensional model based on the three-dimensional information.

Capable of using only one projection view to perform the initial reconstruction of a 3D vessel model, the disclosed method and device can reduce the amount of radiation exposure for doctor and patients. They also relax requirement for obtaining 3D vessel reconstruction, as it removes the stringent requirements for traditional multi-view reconstruction algorithm, which requires at least two projection views from sufficiently different angles that both show the target vessel clearly without overlapping with other nearby vessels. Reconstructing from a single-view projection image is also faster compared to multi-view reconstruction, which requires finding correspondence points among different views.

It is to be understood that both the foregoing general description and the following detailed description are exemplary and explanatory only and are not restrictive of the invention, as claimed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments, and together with the description and claims, serve to explain the disclosed embodiments. When appropriate, the same reference numbers are used throughout the drawings to refer to the same or like parts. Such embodiments are demonstrative and not intended to be exhaustive or exclusive embodiments of the present method, device, or non-transitory computer readable medium having instructions thereon for implementing the method.

FIG. 5A illustrates an exemplary three-dimensional image reconstruction framework for performing a single-view three-dimensional reconstruction using a depth-based approach, according to an embodiment of the present disclosure.

FIG. 5B illustrates an exemplary three-dimensional image reconstruction framework for performing a single-view three-dimensional reconstruction using a model-based approach, according to an embodiment of the present disclosure.

DETAILED DESCRIPTION

Reference will now be made in detail to the exemplary embodiments, examples of which are illustrated in the accompanying drawings.

The present disclosure provides a 3D image reconstruction method that can reconstruct a 3D model of an object (e.g., a blood vessel) from a single-view 2D projection image captured of that object, without the requirement of multi-view projection images. The disclosed image reconstruction method may first estimate three-dimensional information from the single-view 2D projection image (e.g., an X-ray angiographic image) using an inference model. For example, in a depth-based approach, the three-dimensional information estimated by the inference model may be depth information of key points or dense points of the object. In a model-based approach, the three-dimensional information may be model parameters that characterize the 3D model of the object, including, e.g., shape parameters and pose parameters. The disclosed image reconstruction method then reconstructs a three-dimensional image based on the three-dimensional information. For example, in the depth-based approach, the 3D image of the object is reconstructed using the coordinates in the transverse plane (e.g., the projection plane) and the depth information estimated by the inference model. In the model-based approach, the 3D model of the object can be reconstructed using the shape parameters and pose parameters. The disclosed diagnostic image reconstruction method thus can reconstruct a 3D model of the object from just a single-view projection image.

Figure 1:
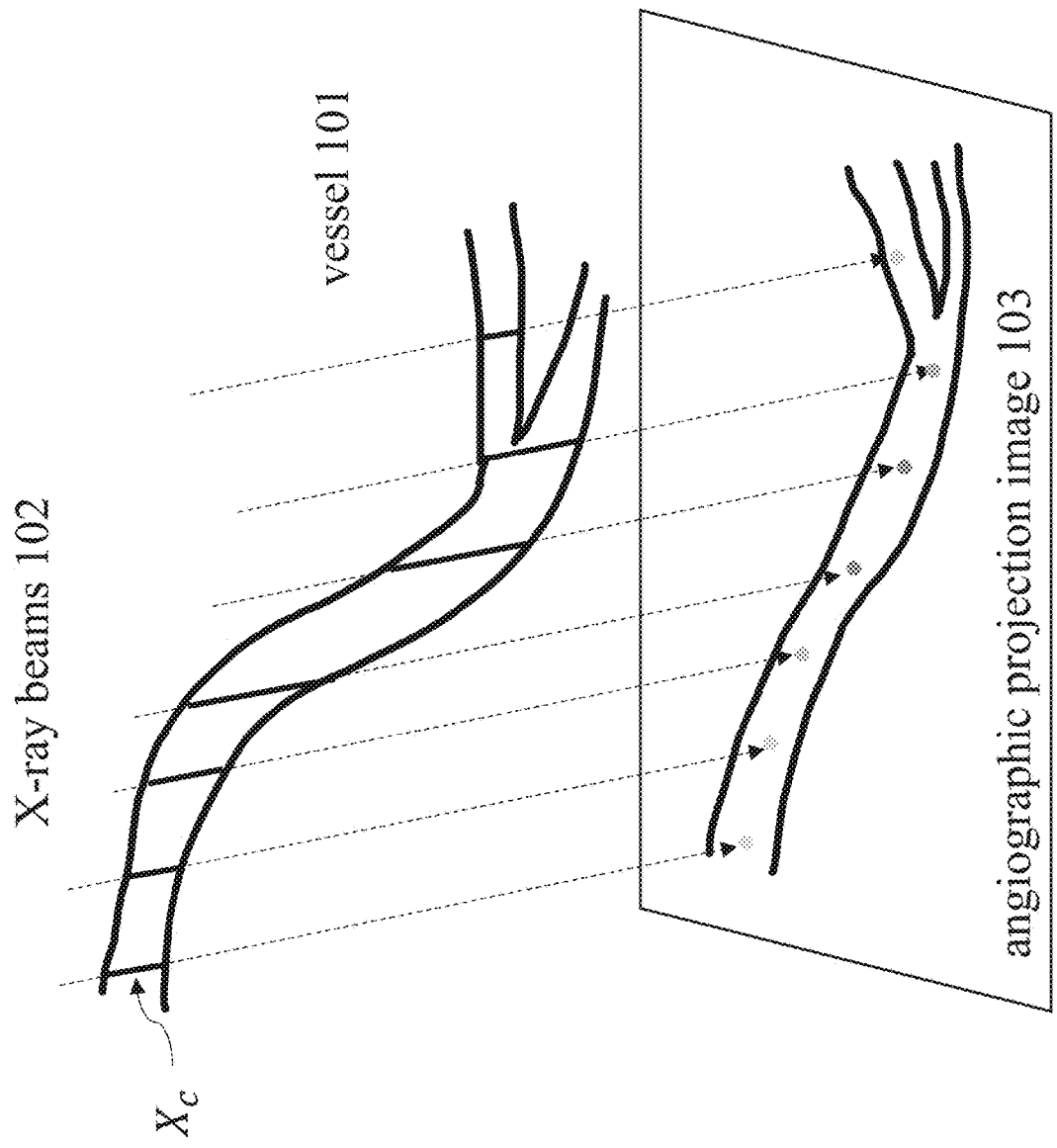
FIG. 1 illustrates angiographic imaging through projection of a blood vessel, according to certain embodiments of the present disclosure.

The disclosed image reconstruction method takes advantage of the physics behind the formation of a projection image. For example, FIG. 1 illustrates angiographic imaging through projection of a blood vessel, according to certain embodiments of the present disclosure. As shown FIG. 1, vessel 101 is a 3D object in a patient. For example, vessel 101 may be a blood vessel, such as a coronary artery vessel, a cerebral artery, a blood vessel in the eye, or a vein, etc. It is contemplated that vessel 101 may be other types of vessel or any tree-structured 3D object, such as an air pathway in the lung. X-ray beams 102 are projected on vessel 101 to form an angiographic projection image 103 on the projection plane. For example, a contrast agent is injected into vessel 101, followed by projecting X-ray beams 102 to vessel 101 using a C-arm X-ray scanner.

Based on angiography X-ray physics, each pixel's intensity value is proportional to the accumulation of exponential attenuation along the x-ray traveling path along the material. For example, as shown in FIG. 1, the traveling distances $X_c$ ($X_{c1}$, $X_{c2}$, ..., and $X_{cn}$) at multiple positions of the blood vessel in the projection direction of the blood vessel dictate the attenuation of the X-ray at those respective positions of the blood vessel. For simplicity, assume there are two materials, one for the contrast agent inside vessel lumen and another for the other organ tissues. The mathematical relationship can be written as Equation 1.

$$I \propto \exp(-(\lambda_c X_c + \lambda_o X_o)) \quad \text{(Eq. 1)}$$

where $\lambda_c$ and $\lambda_o$ are mass attenuation coefficients for contrast agent and other organ tissues, which are known constants with $\lambda_c > \lambda_o$. $X_c$ and $X_o$ are X-ray traveling distance in contrast agent, i.e., vessel, and other organ tissues.

The attenuated X-ray beams 102 then form angiographic projection image 103 on the projection plane. Angiographic projection image 103 has pixels of different intensities. FIG. 1 illustrates how pixel intensities in angiographic projection image 103 are influenced by the X-ray travelling distance $X_c$ in vessel. As shown in FIG. 1, the pixel intensities are darker where the vessel shape is more along, instead of perpendicular to, the X-ray projection direction, due to the larger $X_c$. Intuitively, darker vessel intensities are shown on the projected images where the vessel travels along the X-ray projection direction for a longer distance $X_c$, as the X-ray is attenuated by a thicker layer of contrast agent. Thus, reconstructing the depth and vessel shape from a single projection image is theoretically feasible.

Figure 2:
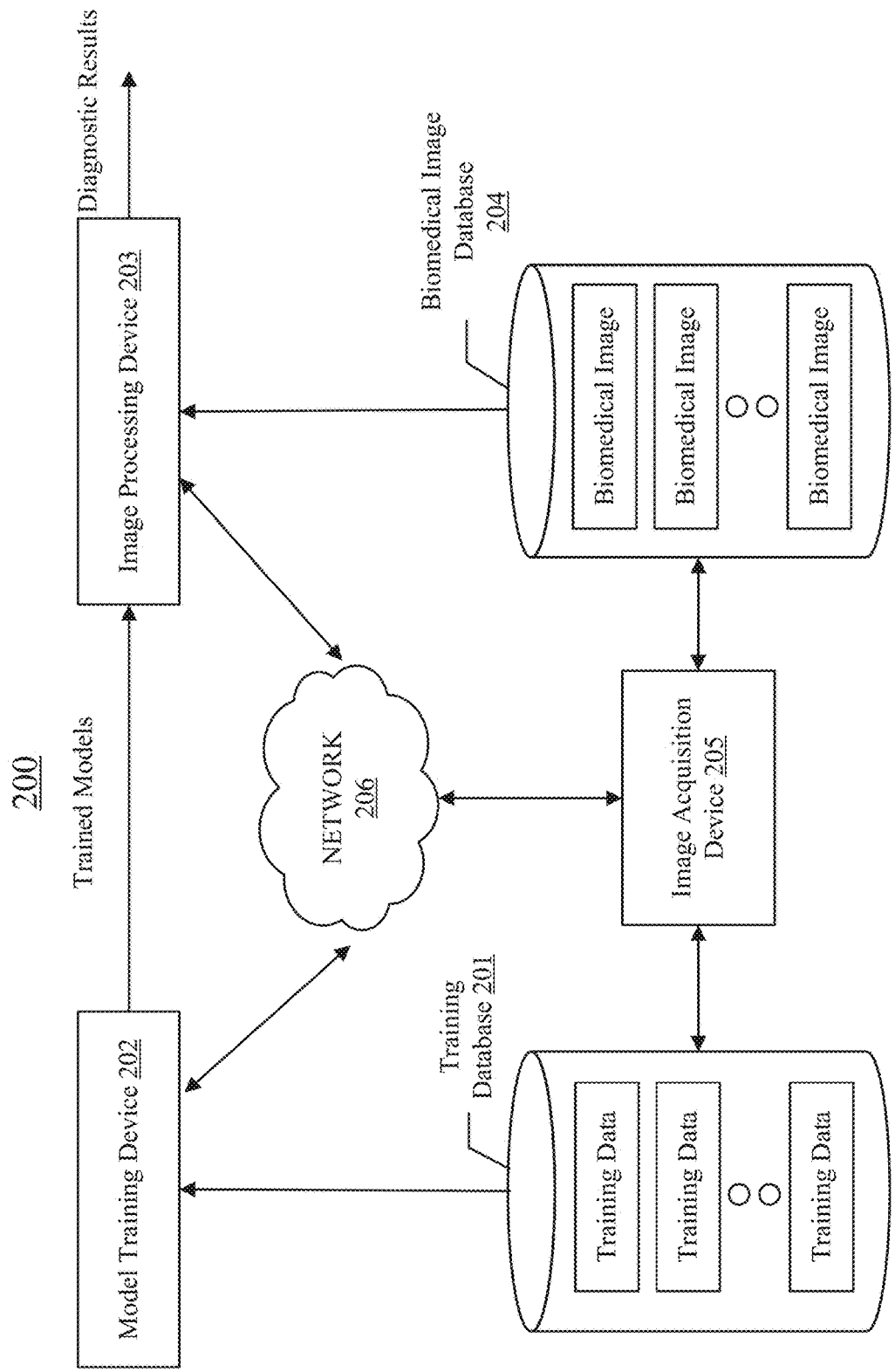
FIG. 2 illustrates a schematic diagram of an exemplary image reconstruction system, according to certain embodiments of the present disclosure.

FIG. 2 illustrates an exemplary image reconstruction system 200, according to some embodiments of the present disclosure. Consistent with the present disclosure, image reconstruction system 200 may be configured to reconstruct a 3D image (also referred to as a 3D model) from a single-view 2D image acquired by an image acquisition device 205 and optionally perform a diagnosis based on the reconstructed image.

In some embodiments, image acquisition device 205 may be a C-arm X-ray scanner used to acquire angiographic projection images. In some other embodiments, image acquisition device 205 may be an imaging device that acquires 2D images through projections. For example, image acquisition device may use imaging modalities including, but are not limited to, Cone Beam CT (CBCT), Spiral CT, Positron Emission Tomography (PET), Single-Photon Emission Computed Tomography (SPECT), X-ray, optical tomography, fluorescence imaging, and radiotherapy portal imaging, etc., or the combination thereof.

As shown in FIG. 2, image reconstruction system 200 may include components for performing two phases, a training phase and a prediction phase. The prediction phase may also be referred to as an inference phase. To perform the training phase, image reconstruction system 200 may include a training database 201 and a model training device 202. To perform the prediction phase, image reconstruction system 200 may include an image processing device 203 and a medical image database 204. In some embodiments, image reconstruction system 200 may include more or less of the components shown in FIG. 2. For example, when a learning model used for reconstructing the 3D images is pre-trained and provided, image reconstruction system 200 may include only image processing device 203 and medical image database 204.

Image reconstruction system 200 may optionally include a network 206 to facilitate the communication among the various components of image reconstruction system 200, such as databases 201 and 204, devices 202, 203, and 205. For example, network 206 may be a local area network (LAN), a wireless network, a cloud computing environment (e.g., software as a service, platform as a service, infrastructure as a service), a client-server, a wide area network (WAN), etc. In some embodiments, network 206 may be replaced by wired data communication systems or devices.

In some embodiments, the various components of image reconstruction system 200 may be remote from each other or in different locations and be connected through network 206 as shown in FIG. 2. In some alternative embodiments, certain components of image reconstruction system 200 may be located on the same site or inside one device. For example, training database 201 may be located on-site with or be part of model training device 202. As another example, model training device 202 and image processing device 203 may be inside the same computer or processing device.

Model training device 202 may use the training data received from training database 201 to train a 3D information inference model for determining 3D information from a single-view 2D image received from, e.g., medical image database 204. In some embodiments, model training device 202 may train other learning models, such as an image reconstruction model for reconstructing the 3D image from 3D information determined by the inference model. As shown in FIG. 2, model training device 202 may communicate with training database 201 to receive one or more sets of training data. In certain embodiments, each set of training data may include ground truth 3D information obtained through human annotation and/or automatically computed by computers.

In some embodiments, the training phase may be performed "online" or "offline." "Online" training refers to performing the training phase contemporarily with the prediction phase, e.g., learning the model in real-time just prior to analyzing a medical image. An "online" training may have the benefit to obtain a most updated learning model based on the training data that is then available. However, "online" training may be computational costive to perform and may not always be possible if the training data is large and/or the model is complicated. Consistent with the present disclosure, "offline" training is used where the training phase is performed separately from the prediction phase. The learned model trained offline is saved and reused for analyzing images.

Model training device 202 may be implemented with hardware specially programmed by software that performs the training process. For example, model training device 202 may include a processor and a non-transitory computer-readable medium (discussed in detail in connection with FIG. 3). The processor may conduct the training by performing instructions of a training process stored in the computer-readable medium. Model training device 202 may additionally include input and output interfaces to communicate with training database 201, network 206, and/or a user interface (not shown). The user interface may be used for selecting sets of training data, adjusting one or more parameters of the training process, selecting or modifying a framework of the learning model, and/or manually or semi-automatically providing prediction results associated with an image for training.

Consistent with some embodiments, the trained model may include a variety of modules or layers arranged in series and/or in parallel. In some embodiments, the 3D information inference model may be implemented as a regression model trained with exemplar training data using deep learning or other machine learning models.

Returning to FIG. 2, the trained diagnosis model may be used by the image processing device to reconstruct the 3D images for diagnosis purposes. Image processing device 203 may receive the trained models, e.g., the 3D information inference model and/or the image reconstruction model, from model training device 202. Image processing device 203 may include a processor and a non-transitory computer-readable medium (discussed in detail in connection with FIG. 3). The processor may perform instructions of a medical image diagnostic analysis program stored in the medium. Image processing device 203 may additionally include input and output interfaces (discussed in detail in connection with FIG. 3) to communicate with medical image database 204, network 206, and/or a user interface (not shown). The user interface may be used for selecting a single-view 2D image for reconstruction, initiating the reconstruction process, and displaying the reconstruction results.

Image processing device 203 may communicate with medical image database 204 to receive single-view 2D images. The single-view 2D images may be projection images of one or more 3D objects (e.g., a vessel) acquired by image acquisition devices 205. Image processing device 203 may reconstruct a 3D image of the 3D object from each single-view 2D image. In some embodiments, image processing device 203 may first determine 3D information from the single-view 2D image using the trained inference model. In some embodiments, the inferred 3D information can be depth information indicating a distance between each key point or dense point of the 3D object and a projection plane of the single-view 2D image. In some alternative embodiments, the inferred 3D information can be model parameters such as shape parameters and/or pose parameters of a deformable model for the 3D object. Image processing device 203 may then construct a 3D model of the 3D object using the inferred 3D information. Depending on the type of the 3D information, the reconstruction may be a depth-based reconstruction or a model-based reconstruction. The image reconstruction process performed by image processing device 203 will be described in more detail in connection with FIGS. 4, 5A-5B, and 6.

Figure 3:
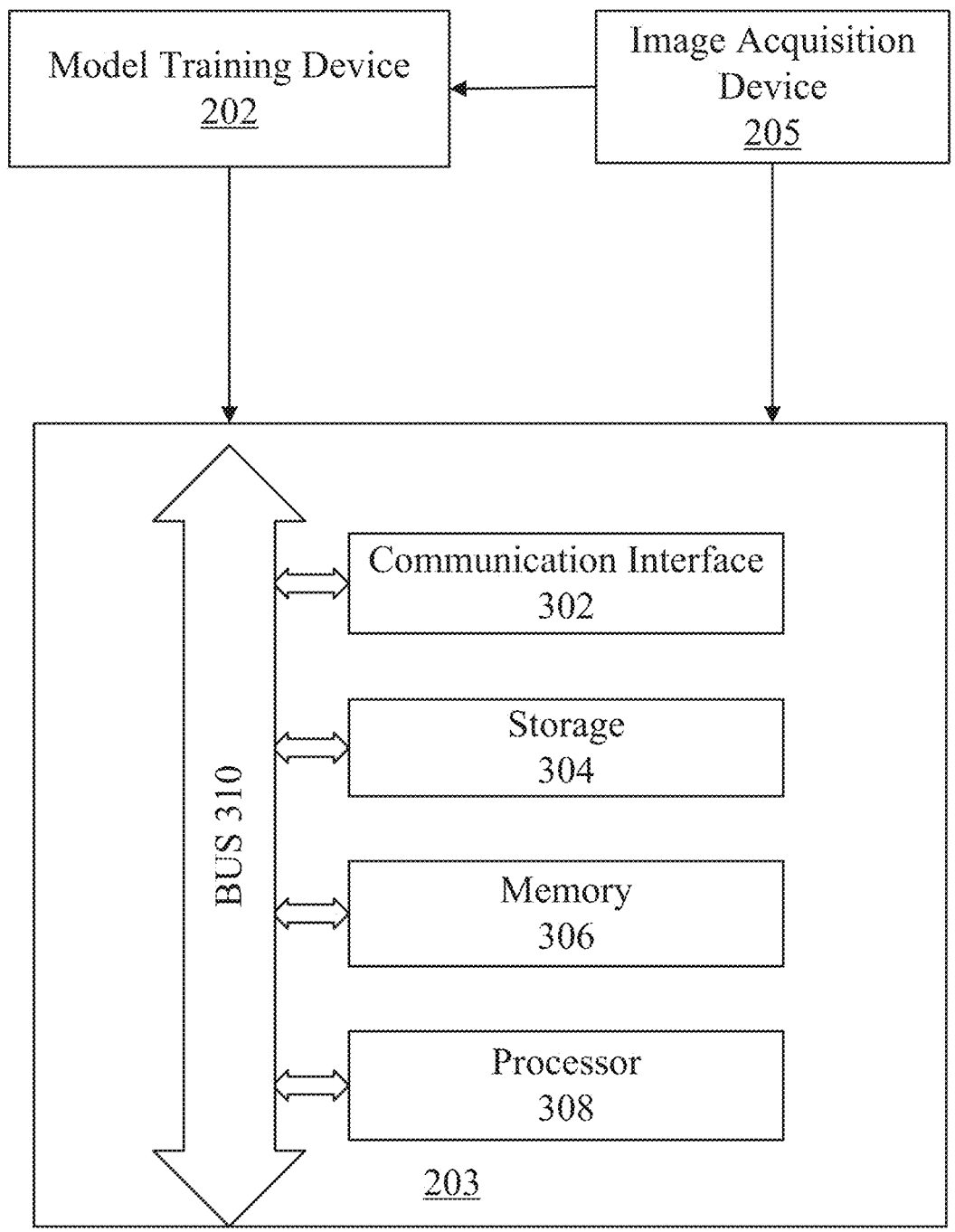
FIG. 3 illustrates a schematic diagram of an image processing device, according to certain embodiments of the present disclosure.

Systems and methods disclosed in the present disclosure may be implemented using a computer system, such as shown in FIG. 3. In some embodiments, image processing device 203 may be a dedicated device or a general-purpose device. For example, the image processing device 203 may be a computer customized for a hospital for processing image data acquisition and image data processing tasks, or a server in a cloud environment. The image processing device 203 may include one or more processor(s) 308 and one or more storage device(s) 304. The processor(s) 308 and the storage device(s) 304 may be configured in a centralized or distributed manner. The image processing device 203 may also include a medical database (optionally stored in storage device 304 or in a remote storage), an input/output device (not shown, but which may include a touch screen, keyboard, mouse, speakers/microphone, or the like), a network interface such as communication interface 302, a display (not shown, but which may be a cathode ray tube (CRT) or liquid crystal display (LCD) or the like), and other accessories or peripheral devices. The various elements of image processing device 203 may be connected by a bus 310, which may be a physical and/or logical bus in a computing device or among computing devices.

The processor 308 may be a processing device that includes one or more general processing devices, such as a microprocessor, a central processing unit (CPU), a graphics processing unit (GPU), and the like. More specifically, the processor 308 may be a complex instruction set computing (CISC) microprocessor, a reduced instruction set computing (RISC) microprocessor, a very long instruction word (VLIW) microprocessor, a processor running other instruction sets, or a processor that runs a combination of instruction sets. The processor 308 may also be one or more dedicated processing devices such as application-specific integrated circuits (ASICs), field-programmable gate arrays (FPGAs), digital signal processors (DSPs), system-on-chip (SoCs), and the like.

The processor 308 may be communicatively coupled to the storage device 304 and configured to execute computer-executable instructions stored therein. For example, as illustrated in FIG. 3, a bus 310 may be used, although a logical or physical star or ring topology would be examples of other acceptable communication topologies. The storage device 304 may include a read-only memory (ROM), a flash memory, random access memory (RAM), a static memory, a volatile or non-volatile, magnetic, semiconductor, tape, optical, removable, nonremovable, or other types of storage device or tangible (e.g., non-transitory) computer-readable medium. In some embodiments, the storage device 304 may store computer-executable instructions of one or more processing programs and data generated when a computer program is executed. The processor may execute the processing program to implement each step of the methods described below. The processor may also send/receive medical data to/from the storage device.

The image processing device 203 may also include one or more digital and/or analog communication (input/output) devices, not illustrated in FIG. 3. For example, the input/output device may include a keyboard and a mouse or trackball that allow a user to provide input. The image processing device 203 may further include a network interface, illustrated as communication interface 302, such as a network adapter, a cable connector, a serial connector, a USB connector, a parallel connector, a high-speed data transmission adapter such as optical fiber, USB 3.0, lightning, a wireless network adapter such as a WiFi adapter, or a telecommunication (3G, 4G/LTE, etc.) adapter and the like. The image processing device 203 may be connected to a network through the network interface. The image processing device 203 may further include a display, as mentioned above. In some embodiments, the display may be any display device suitable for displaying a medical image and its segmentation results. For example, the image display may be an LCD, a CRT, or an LED display.

The image processing device 203 may be connected to model training device 202 and image acquisition device 205 as discussed above with reference to FIG. 2. Other implementations are also possible.

Figure 4:
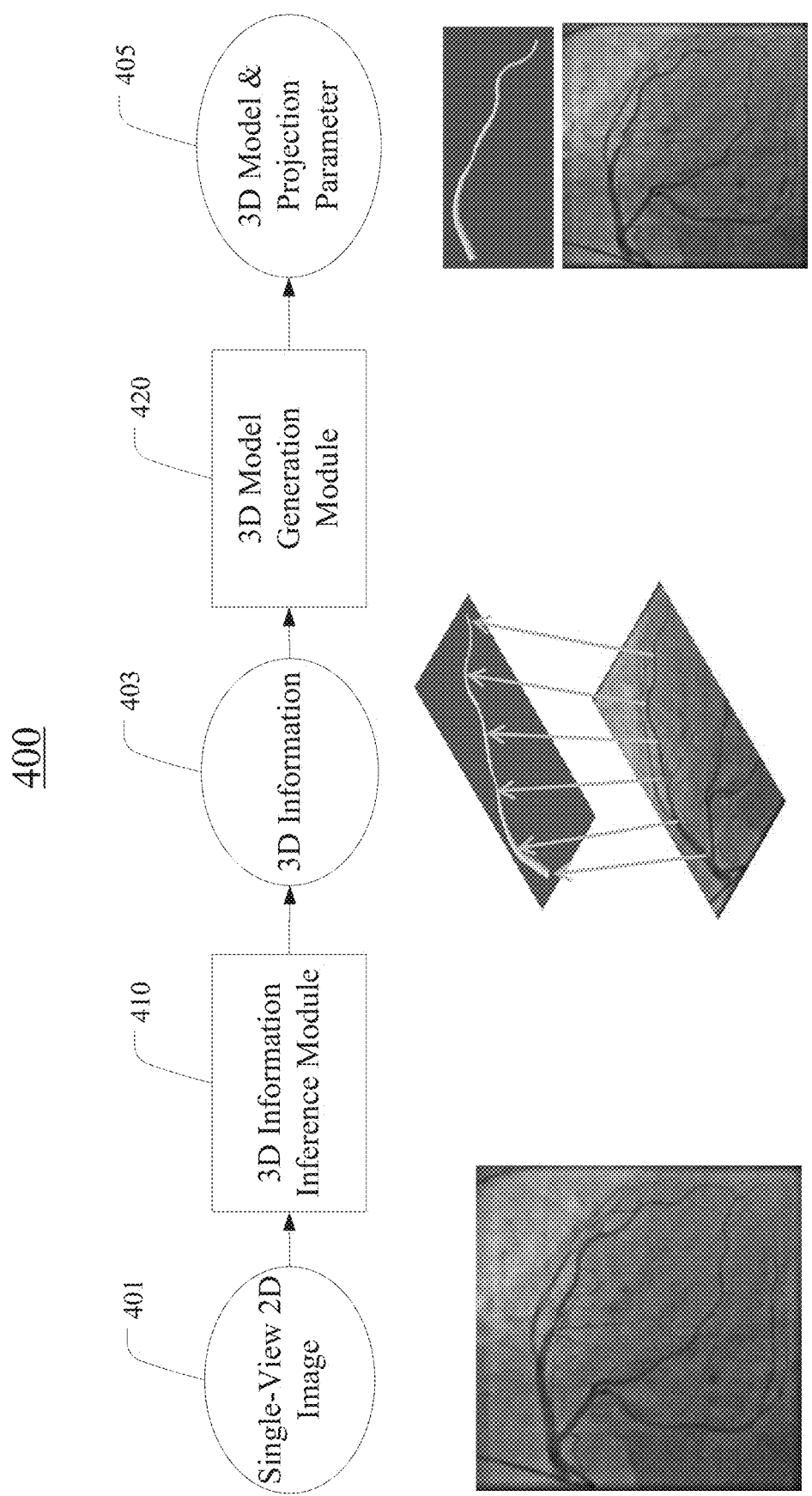
FIG. 4 illustrates an exemplary three-dimensional image reconstruction framework for performing a single-view three-dimensional reconstruction, according to certain embodiments of the present disclosure.

FIG. 4 illustrates an exemplary three-dimensional image reconstruction framework 400 (hereafter framework 400) for performing the single-view three-dimensional reconstruction according to an embodiment of the present disclosure. Framework 400 may be implemented by image processing device 203 by executing computer instructions loaded in its memory. In some embodiments, framework 400 may contain two modules: a 3D information inference module 410 and a 3D model generation module 420. 3D information inference module 410 receives a single-view 2D image 401 and infers 3D information 403 necessary to reconstruct the 3D model of the 3D object (e.g., a vessel). Again, single-view 2D image 401 may be a projection image acquired in a single projection direction.

In some embodiments, framework 400 could be implemented for depth-based reconstruction or model-based reconstruction, or a hybrid of thereof. For example, FIG. 5A illustrates an exemplary three-dimensional image reconstruction framework 510 (hereafter framework 510) for performing a single-view three-dimensional reconstruction using a depth-based approach according to an embodiment of the present disclosure, and FIG. 5B illustrates an exemplary three-dimensional image reconstruction framework 520 (hereafter framework 520) for performing a single-view three-dimensional reconstruction using a model-based approach according to an embodiment of the present disclosure. FIGS. 4, 5A, and 5B will be described together.

3D information inference module 410 may use image processing techniques and analytical formula using Equation (1), or implemented as a learning-based model formulated as a regression problem trained with exemplar training data using deep learning or other machine learning techniques. In some embodiments, the 3D information inference model can take the 2D image acquisition meta information, manually crafted features, image patches (2D image patches or 2D+time patches from video), or the whole image/video as input. Depending on the reconstruction approach used, 3D information inference module 410 may output different types of 3D information for later constructing the 3D model.

For the depth-based reconstruction framework shown in FIG. 5A, the 3D information 403 in FIG. 4 could be depth information 403A on certain key points or dense points. Depth information 403A includes the distance from a 3D point to the projected view image plane, for all pixels (dense points) in the 2D single view image or key pixels (key points) of the 2D single view image that are representative of the 3D object. Examples of key points may include landmarks of the 3D object or centerline points (e.g., for a vessel). In some embodiments, framework 510 may further include an optional key point detection module 511 for detecting these key points. For example, key point detection module 511 may obtain a 2D centerline and corresponding radii for centerline point by an automatic or manual segmentation of the target vessel from the 2D projection image. 3D information inference module 410A is then used to estimate the depth on each centerline point. It should be noted that the centerline extraction performed by key point detection module 511 is only optional and not essential. Even without the centerline, depth information can be estimated densely for every pixel in the vessel or every pixel in the single-view 2D image.

For the model-based reconstruction framework shown in FIG. 5B, the 3D information 403 in FIG. 4 could be model parameters 403B of model of the 3D object. Accordingly, in this approach, 3D information inference module 410B estimates the shape parameter which determines the shape, and the pose parameter which determines the projection relationship. The model of the 3D object may be a rigid or deformable model whose shape is controlled by a set of shape parameters, and projection specified by corresponding pose parameters. In some embodiments, the model shape parameters may be the shape variation mode weights specified by on training data during training of the inference model. For example, during training, the target object mean shape and shape variation mode can be obtained from training set by methods such as principal component analysis. Then the target object shape can be represented by a weight vector signaling the contribution of each shape variation mode. For example, a larger value of the first weight may indicate the object is longer along a certain axis, while a larger value of the second weight may indicate a bigger bulge in the middle. Given the shape parameter vector, a unique shaped model can be determined. The pose parameters define a projection relationship of the object (e.g., a blood vessel) with the predetermined projection direction. The pose parameters may include, e.g., rotation and distance of the 3D model to the projection view plane.

3D information inference module 410A may use an inference model formulated to solve an optimization problem aimed at optimizing both the shape and pose parameters. 3D information inference module 410A solves this optimization problem so that the optimal shape and pose parameters are returned, whose simulated projection matches the given input projected view (the input 2D projection image) closely.

Returning back to FIG. 4, 3D model generation module 420 can receive the 3D information 403 and generate the 3D model based on the 3D information 403, e.g., the estimated depth information (e.g., FIG. 5A) and/or the model shape and pose information (e.g., FIG. 5B). For depth-based reconstruction shown in FIG. 5A, the corresponding 3D model generation module 420A reconstructs the 3D coordinates of the 3D model based on the (x, y) coordinates of each projected point in the projection view plane and the corresponding depth, i.e., z coordinate, estimated by 3D information inference module 410A. For example, 3D model generation module 420A can use the 2D centerline point coordinates, and corresponding depth and radius to render a 3D vessel as a tube-like object. It should be noted that orthographic projection (aka parallel projection) is assumed here but the method can be easily adapted and extended to perspective projection, in which the depth is along the projection ray.

For model-based reconstruction shown in FIG. 5B, the corresponding 3D model generation module 420B reconstructs the 3D model for the object from the optimal set of shape parameters and pose parameters estimated by 3D information inference module 410B. For example, the 3D model can be constructed using the shape variation mode weights, the rotation and distance of the model to the projection plane, etc.

In some embodiments, 3D model generation module 420 may further generate corresponding projection parameters 405. Examples of projection parameters 405 include rotation (the projection direction), distance (between the 3D object and the projection view plane), etc. The goal of reconstruction is that projecting the reconstructed 3D model according to the corresponding projection parameters matches input single-view 2D image 401 as much as possible.

In some embodiments, the 3D model could be represented in different forms, including a series of 3D centerline points with varying diameters, surface mesh or volumetric representation. The reconstructed 3D model may be rendered and displayed on a display of image processing device 203 for a user to view. In some embodiments, the user can interact with the 3D model, including adjusting the display view of the 3D model, zoom-in/zoom-out the 3D model, or alter certain aspects of the 3D model.

Various analyses and tasks can be performed, by image processing device 203 or a separate device, on the reconstructed 3D image. For example, the image may be analyzed for a medical diagnosis of the patient. In some embodiments, the analysis may calculate certain physiological parameters to aid the medical diagnosis. For example, when the 3D image is a 3D model of a coronary artery, parameters such as a fractional flow reserve (FFR) value may be calculated for certain points of the blood vessel. Based on the calculated FFR values, a medical diagnosis indicating the likelihood that the stenosis impedes oxygen delivery to the heart muscle (myocardial ischemia) may be determined.

Figure 6:
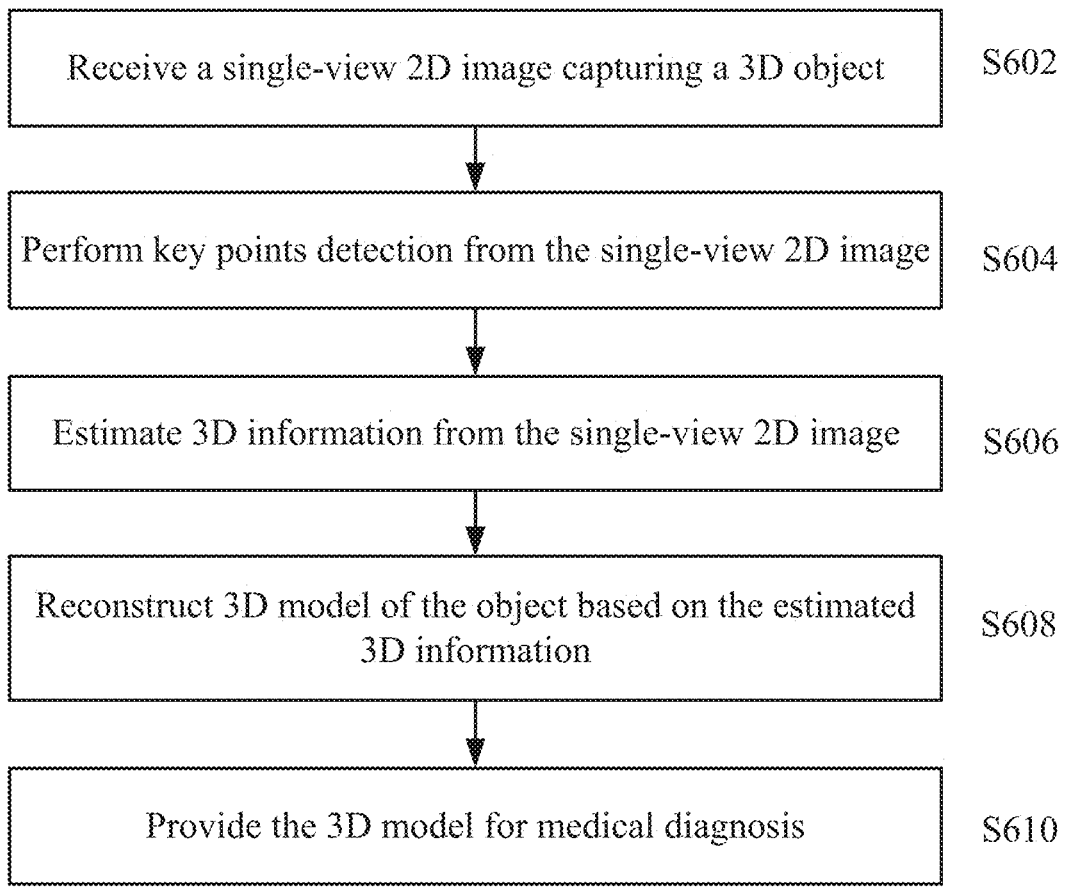
FIG. 6 shows a flowchart of an exemplary process for performing a three-dimensional image reconstruction, according to certain embodiments of the present disclosure.

FIG. 6 shows a flowchart of an exemplary process 600 for performing a three-dimensional image reconstruction according to certain embodiments of the present disclosure. Process 600 may be performed by image processing device 203 using a three-dimensional image reconstruction framework, such as one shown in FIG. 4, 5A or 5B. As shown in FIG. 6, process 600 may include steps S602-S610. It is contemplated that process 600 may include more or less steps as shown in FIG. 6. In addition, the steps may be performed in a sequential order or some steps may be performed in parallel. The steps may also be performed in a different order as shown in FIG. 6.

In step S602, a single-view 2D image capturing a 3D object is received. For example, the single-view 2D image may be an X-ray angiographic image acquired by a C-arm X-ray scanner in a single projection direction. In some embodiments, image processing device 203 may receive the single-view 2D image from a medical image database 204.

In step S604, a key points detection may be performed on the single-view 2D image to identify key points of the 3D object. For example, when the 3D object is a blood vessel, image processing device 203 may first segment the 2D image to obtain a centerline of the blood vessel and then select the key points on the centerline. Step S604 may be performed when process 600 uses a depth-based reconstruction approach, so that depth information can be estimated for the key points (in step S606) to reduce computational cost. Step S604 is optional so it can be skipped in some embodiments of process 600, where step S606 may estimate depth information for all pixels (dense points) in the 2D image.

In step S606, 3D information can be estimated from the single-view 2D image. Depending on the reconstruction approach used, image processing device 203 may estimate different types of 3D information. In the depth-based approach, depth information associated with at least one key point or dense point of the blood vessel may be estimated, by using, e.g., 3D information inference module 410A. The depth information is indicative of a distance between each key point or dense point and a projection plane of the single-view 2D image. In the model-based approach, model parameters such as shape parameters and/or pose parameters of a 3D target model of the object may be estimated, by using, e.g., 3D information inference module 410B. The 3D target model may be a deformable model or a rigid model defined by the model parameters. In some embodiments, step S606 may apply a deep learning or machine learning model/network (e.g., an inference learning network formulated as a regression problem) to perform the 3D information inference. The inference model can be trained using training samples, as will be described in detail in connection with FIG. 7.

In step S608, the 3D model of the object may be reconstructed as a 3D image based on the estimated 3D information. In the depth-based approach, image processing device 203 may generate the 3D model based on the (x, y) coordinates of the key point or dense point in the projection plane of the single-view 2D image along with the depth information (z coordinate) associated with the key point or dense point, by using, e.g., 3D model generation module 420A. In the model-based approach, image processing device 203 may generate the 3D model based on the model parameters, by using, e.g., 3D model generation module 420B.

In step S610, the reconstructed 3D image may be provided for further analysis and medical diagnosis. Physiological or medical parameters may be calculated based on the 3D model of the object, and medical diagnosis can be made based on the calculated parameters. In some embodiments, deep learning or other machine learning techniques can be used for the medical diagnosis from the 3D image.

Figure 7:
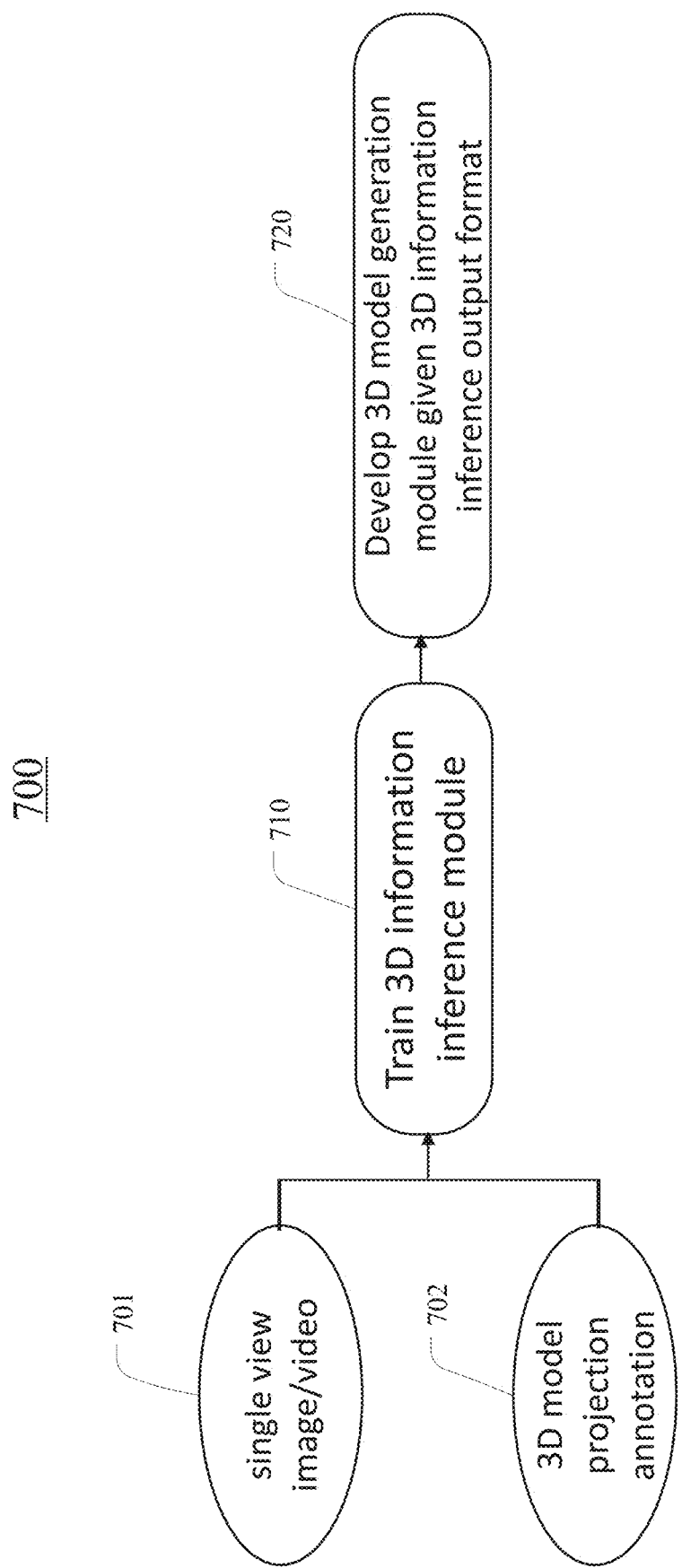
FIG. 7 illustrates an exemplary process for training a three-dimensional image reconstruction framework, according to certain embodiments of the present disclosure.

FIG. 7 illustrates an exemplary process 700 for training a three-dimensional image reconstruction framework (e.g., framework 400), according to certain embodiments of the present disclosure. The training data may include sample single-view images or videos 701 and their corresponding 3D model projection annotations 702. 3D model projection annotations 702 can be obtained in various ways. In some embodiments, another modality from which the 3D model can be readily obtained. For example, a 3D CT angiographic image can be acquired by imaging devices such a CT scanner, and the 3D model can be constructed from the acquired 3D image. The projection parameters can be derived from geometric parameters recorded by the imaging acquisition device (e.g., an imaging scanner). These parameters can also be refined by optimizing the alignment of projected 3D model and angiographic images. In some embodiments, the 3D model projection annotation can be obtained using multi-view 3D model reconstruction algorithm. In some embodiments, the 3D model projection annotation can also be synthetic data obtained by first rendering a 3D model and then projecting the 3D model to produce a synthetic single-view projection image using an image generator/renderer. The synthetic data could be realistic given a powerful image generator/renderer. In yet some embodiments, human annotator can finetune annotations of the 3D model and projection parameters.

In step 710, a 3D information inference module (e.g., module 410) may be trained with the training data to infer the 3D information from a 2D projection image. The training of the 3D information inference model can be conducted according to a predetermined output format (e.g., depth information or model parameters). For a depth-based system, the output 3D information format is the depth, i.e., distance from 3D point to the projected view image plane, for dense or key pixels such as centerline in the single view projection image. In this case, the inference model may be formulated with physics-based formula computations, with certain parameters tuned based on the training data. Accordingly, a depth information inference module, such as module 410A, is trained. For a deformable model-based system, the output 3D information format is the model shape parameters (such as the shape variation mode weights specified by the principal component analysis on training data) that defines the shape of the object model, and/or the pose parameters (such as rotation and distance of the 3D model to the projection plane) that indicates a projection relationship of the object with the predetermined projection direction. In some embodiments, for a model-based system, the 3D information inference module may be a machine learning model or a deep learning model. For example, the learning model may be formulated as a regression problem. Accordingly, a model parameter inference module, such as module 410B, is trained. The training may use a cost function that optimize the depth information or set of shape/pose parameters such that a simulated projection image obtained by projecting the 3D model along a predetermined projection direction matches the ground truth projection image along that same projection direction.

In step 720, a 3D model generation module (e.g., module 420) may be developed for generating a 3D model of the object based on the 3D information. The 3D model generation module may be developed according to the 3D information inference output format. For a depth-based system, the output 3D information format is the depth, therefore the corresponding 3D model generation module is developed to reconstruct the 3D coordinates and model based on the (x, y) coordinate of each projected point and the corresponding depth, i.e., z coordinate. Accordingly, a depth-based 3D model generation module, such as module 410B, is developed. For a deformable model-based system, the 3D information format is the model shape parameters and/or pose parameters, therefore the corresponding 3D model generation module is developed to reconstruct the 3D model from the shape parameters and pose parameters. For example, a model-based 3D model generation module, such as module 410B, is developed.

In some embodiments, the computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

For example, although angiographic images of vessel (such as coronary artery, neck artery and brain artery images) are used as an example for disclosing the systems and methods herein, it is contemplated that the disclosed systems and methods can be adapted and applied to other potential applications. The disclosed systems and methods can be used to reconstruct 3D images of any 3D objects that can be captured by projection imaging, beyond just vessels. For example, the disclosed systems and methods such as reconstructing chest organs from chest X-rays. Such adaption and application are within the ability of an ordinary skill in art. Therefore, the scope of the disclosure should not be construed to be limited to reconstructing blood vessel models, but encompass reconstruction of other three-dimensional biomedical images from a single-view projection image using the disclosed technique.

Further, the disclosed systems and methods can also be used to reconstruct 3D images of any imaging modality that can obtain projection images, beyond just X-ray or CT. For example, imaging modalities in the disclosed systems and methods may be alternatively or additionally applied to other imaging modalities where the pixel intensity varies with the distance traveled by imaging particles, such as CT, cone beam computed tomography (CBCT), Spiral CT, positron emission tomography (PET), single-photon emission computed tomography (SPECT), etc.

It is intended that the specification and examples be considered as exemplary only, with a true scope being indicated by the following claims and their equivalents.

What is claimed is:

1. A device for three-dimensional blood vessel reconstruction, comprising:
    an interface configured to receive one single-view two-dimensional image of a blood vessel of a patient, wherein the single-view two-dimensional image is a projection image acquired in a predetermined projection direction; and
    a processor configured to:
        estimate three-dimensional information of the blood vessel from the one single-view two-dimensional image using an inference model, wherein the inference model is trained using training data including sample single-view images and their corresponding 3D model projection annotations; and
        reconstruct a three-dimensional model of the blood vessel based on the three-dimensional information.

2. The device according to claim 1, wherein the three-dimensional information estimated by the inference model comprises depth information associated with at least one key point or dense point of the blood vessel, wherein the depth information is indicative of a distance between each key point or dense point and a projection plane of the single-view two-dimensional image.

3. The device according to claim 1, wherein the three-dimensional information estimated by the inference model comprises at least one shape parameter defining a shape of a model of the blood vessel.

4. The device according to claim 3, wherein the model of the blood vessel is a rigid model or a deformable model of the blood vessel.

5. The device according to claim 3, wherein the three-dimensional information estimated by the inference model further comprises at least one pose parameter indicative of a projection relationship of the blood vessel with the predetermined projection direction.

6. The device according to claim 1, wherein the single-view two-dimensional image is an X-ray angiographic image of the patient acquired by a C-arm x-ray scanner.

7. A computer-implemented method for performing three-dimensional image reconstruction, comprising:
    receiving one single-view two-dimensional image of a patient, wherein the single-view two-dimensional image is a projection image acquired in a predetermined projection direction;
    estimating, by a processor, three-dimensional information from the one single-view two-dimensional image using an inference model, wherein inference model is trained using training data including sample single-view images and their corresponding 3D model projection annotations; and
    reconstructing, by the processor, a three-dimensional model based on the three-dimensional information.

8. The computer-implemented method according to claim 7, wherein the single-view two-dimensional image captures a blood vessel of the patient, and the three-dimensional model is a three-dimensional model of the blood vessel.

9. The computer-implemented method according to claim 8, wherein the three-dimensional information estimated by the inference model comprises depth information associated with at least one key point or dense point of the blood vessel, wherein the depth information is indicative of a distance between each key point or dense point and a projection plane of the single-view two-dimensional image.

10. The computer-implemented method according to claim 9, further comprising:
    determine a centerline of the blood vessel from the single view two-dimensional image;
    determine at least one point on the centerline as the at least one key point or dense point of the blood vessel; and
    apply the inference model to determine the depth information of the at least one key point or dense point of the blood vessel.

11. The computer-implemented method according to claim 9, wherein reconstructing a three-dimensional model based on the three-dimensional information further comprises:
    constructing the three-dimensional model of the blood vessel using coordinates of the key point or dense point of the blood vessel in the projection plane and the depth information of the key point or dense point.

12. The computer-implemented method according to claim 8, wherein the three-dimensional information estimated by the inference model comprises at least one shape parameter defining a shape of a model of the blood vessel.

13. The computer-implemented method according to claim 12, wherein the model of the blood vessel is a rigid model or a deformable model of the blood vessel.

14. The computer-implemented method according to claim 12, wherein the at least one shape parameter comprises shape variation mode weights defining a target object shape determined from training data used for training the inference model.

15. The computer-implemented method according to claim 12, wherein the three-dimensional information estimated by the inference model further comprises at least one pose parameter indicative of a projection relationship of the blood vessel with the predetermined projection direction.

16. The computer-implemented method according to claim 15, wherein reconstructing a three-dimensional model based on the three-dimensional information further comprises:
    constructing the three-dimensional model of the blood vessel using the at least one shape parameter and the at least one pose parameter.

17. The computer-implemented method according to claim 7, wherein the single-view two-dimensional image is an X-ray angiographic image of the patient.

18. A non-transitory computer-readable medium, having instructions stored thereon, wherein the instructions, when executed by a processor, perform a method for performing three-dimensional image reconstruction, wherein the method comprises:
    receiving one single-view two-dimensional image of a patient, wherein the single-view two-dimensional image is a projection image acquired in a predetermined projection direction;
    estimating three-dimensional information from the one single-view two-dimensional image using an inference model, wherein the inference model is trained using training data including sample single-view images and their corresponding 3D model projection annotations; and reconstructing a three-dimensional model based on the three-dimensional information.

\* \* \* \* \*